(12) United States Patent
Broadbent et al.

(10) Patent No.: US 12,522,312 B2
(45) Date of Patent: Jan. 13, 2026

(54) BICYCLE FRAME MOUNTING DEVICE

(71) Applicant: TAILFIN LIMITED, Bristol (GB)

(72) Inventors: Nicholas Broadbent, Long Ashton North (GB); Robert Phillips, Bristol (GB)

(73) Assignee: TAILFIN LIMITED, Bristol (GB)

( * ) Notice: Subject to any disclaimer, the term of this patent is extended or adjusted under 35 U.S.C. 154(b) by 563 days.

(21) Appl. No.: 17/969,783

(22) Filed: Oct. 20, 2022

(65) Prior Publication Data

US 2023/0117805 A1    Apr. 20, 2023

(30) Foreign Application Priority Data

Oct. 20, 2021  (GB) ...................................... 2115052

(51) Int. Cl.
*B62J 11/00* (2020.01)
*B62J 7/02* (2006.01)
*B62J 11/04* (2020.01)

(52) U.S. Cl.
CPC ................. *B62J 11/00* (2013.01); *B62J 7/02* (2013.01); *B62J 11/04* (2020.02)

(58) Field of Classification Search
CPC ............... B62J 11/04; B62J 7/02; B62J 11/00
See application file for complete search history.

(56) References Cited

U.S. PATENT DOCUMENTS

| | | | |
|---|---|---|---|
| 4,256,281 A | 3/1981 | Harris et al. | |
| 4,345,704 A | 8/1982 | Boughton | |
| 5,405,113 A * | 4/1995 | Jaw | B62J 11/00 248/552 |
| 5,704,232 A | 1/1998 | Kuo | |
| 5,921,520 A * | 7/1999 | Wisniewski | F16L 3/12 248/316.1 |
| 6,095,386 A * | 8/2000 | Kuo | B62J 11/00 224/935 |
| 8,083,112 B2 * | 12/2011 | Kuo | B62J 11/00 224/547 |
| 8,087,558 B2 * | 1/2012 | Tsai | B62J 11/00 224/431 |

(Continued)

FOREIGN PATENT DOCUMENTS

| | | |
|---|---|---|
| EP | 0832812 A2 | 4/1998 |
| GB | 190901785 A | 4/1909 |

OTHER PUBLICATIONS

Combined Search and Examination Report of GB2115052.9; Apr. 11, 2022; 2 pgs.

*Primary Examiner* — Brian D Nash
(74) *Attorney, Agent, or Firm* — Perilla Knox & Hildebrandt LLP

(57) ABSTRACT

A bicycle accessory mounting device comprises: a flexible band having opposite ends and inner and outer faces; securing means which interconnects the ends of the band thereby to draw the band around a frame member of a bicycle; a connection block having a central abutment surface at which the connection block is secured to the inner face of the band, and a pair of mounting surfaces which extend from the abutment surface and diverge from each other in the direction away from the abutment surface; and respective fasteners provided on the mounting surfaces, the fasteners extending through the band for securing a respective accessory to the outer face of the band.

24 Claims, 3 Drawing Sheets

(56) References Cited

U.S. PATENT DOCUMENTS

| | | | |
|---|---|---|---|
| 11,724,766 B2* | 8/2023 | Munro | B62K 21/125 |
| | | | 74/551.8 |
| 2002/0171244 A1 | 11/2002 | Wachter et al. | |
| 2007/0108244 A1* | 5/2007 | Chuang | B62J 11/00 |
| | | | 224/420 |
| 2007/0119888 A1* | 5/2007 | Chuang | B62J 11/00 |
| | | | 224/427 |
| 2008/0035690 A1* | 2/2008 | Hsai | B62H 5/00 |
| | | | 224/448 |

* cited by examiner

BICYCLE FRAME MOUNTING DEVICE

TECHNICAL FIELD

This invention relates to a bicycle frame mounting device and is particularly, although not exclusively, concerned with a mounting device for mounting an accessory such as a bottle or luggage pack on a frame member of a bicycle. In this specification, the expressions "frame" and "frame member" are used in a broad sense to embrace not only the main "diamond" frame and its components, but also other structural members of the bike shown in FIG. 1 including, for example, the front fork, the seatpost, the chain and seat stays, and the handlebars.

BACKGROUND

Bikepacking is a popular leisure pursuit which often involves multi-day touring on a bicycle, often an off-road bicycle such as a mountain bike. Everything needed for touring is carried on the bicycle or by the rider. Because bikepacking usually involves off-road cycling, anything carried by the bicycle must be securely attached to avoid movement relative to the bicycle frame, which can cause instability and can potentially bring the carried load into contact with the bicycle wheels, the pedal mechanism or the rider.

Various devices are available for fitting to frame members of a bicycle to enable accessories to be carried, such as Velcro straps, jubilee clip devices and clamping mechanisms utilising split rings which are screwed together around the frame member. A problem with known devices is that they are difficult, or impossible, to fit securely to the frame in a way which avoids rotation of the mounting device about the frame member. Another problem is that many known devices tend to damage the frame member, and are thus unpopular with owners of high-value bicycles. Known devices also lack versatility, in that they are not capable of fitting to a variety of cross sectional shapes and dimensions.

By way of example, one known mounting device is disclosed in U.S. Pat. No. 4,345,704. This comprises a band made from a suitable polymer which is wrapped around a bicycle frame tube with its ends brought together by a screw which clamps the band around the frame tube. The band has integral curved plates carrying Velcro pads which are shaped to fit a water bottle provided with complementary Velcro pads. The device of U.S. Pat. No. 4,345,704 lacks versatility, because curved plates are not able to support accessories of other shapes. Also, the device cannot reliably avoid rotation of the mounting device about the frame tube on which it is fitted. A further issue is that the clamping screw sits between the frame tube and the water bottle, so the water bottle is situated some distance from the frame tube. As a result, there is a significant moment arm between the centre of gravity of the water bottle and the frame member axis, increasing the tendency for the device to slip around the frame member under lateral inertia loads.

SUMMARY

According to the present invention there is provided a bicycle accessory mounting device comprising a flexible band having securing means which interconnects the ends of the band to draw the band around a frame member of a bicycle, and a connection block which is secured to the inner face of the band and is provided with a screwthreaded fastener which extends through the band for securing an accessory to the outer face of the band.

The connection block provides a secure purchase for the screwthreaded fastener and enables the position of the accessory with respect to the frame member to be optimised.

Another advantage of the connection block is that it may be fitted with a pad of resilient material such as an elastomeric or polymeric material for contact with the frame member. The pad minimises any damage to the frame member and serves to enhance the friction between the device and the frame member to avoid slippage, either lengthwise of the frame member or about its axis. The pad may be releasably connected to the connection block and, for example, may be a push fit on the connection block. The pad may have a concave surface for contact with the frame member.

The securing means may be a screwthreaded bolt which extends between the ends of the band. One end of the band may be provided with a barrel nut which is engaged by the bolt, in which case the other end of the band may be provided with a barrel having a plain bore through which the bolt extends. As a result of this arrangement, the bolt is self-aligning and can adapt to different frame member diameters without imposing undesirable forces on the ends of the bands.

The connection block may be secured to the band at a position away from the securing means, for example substantially centrally between the ends of the band. The connection block may be secured to the band by a screw which extends through a hole in the band into a tapped bore in the connection block.

The connection block may have a central abutment surface at which the connection block is secured to the band, and a pair of mounting surfaces which extend from the abutment surface and diverge from each other in the direction away from the abutment surface, the screwthreaded fastener being one of two screwthreaded fasteners provided at the respective mounting surfaces.

The screwthreaded fasteners may comprise screws which extend through respective holes in the band and engage tapped bores in the respective mounting surfaces.

The abutment surface and the mounting surfaces may be in face-to-face contact with complementary inner surfaces of the band. The abutment surface and the mounting surfaces, and the complementary surfaces, may be flat. The mounting surfaces may be inclined to each other at an angle not less than 45° and not more than 120°.

A second aspect of the present invention provides a kit of parts for assembly to form a mounting device as defined above, the kit comprising:
the band,
the securing means,
the connection block, and
the fastener.

A third aspect of the present invention provides a bicycle provided with an accessory which is mounted on a frame member of the bicycle by means of a mounting device as defined above or assembled from a kit as defined above.

The accessory may be a bottle holder or a luggage pack or container, or a cage for holding such accessories. If the connection block has a pair of mounting surfaces with respective screwthreaded fasteners, two accessories may be mounted on the mounting device by the screwthreaded fasteners.

A fourth aspect of the present invention provides a bicycle accessory mounting device comprising:
- a flexible band having opposite ends and inner and outer faces;
- securing means which interconnects the ends of the band to draw the band around a frame member of a bicycle;
- a connection block which is secured to the inner face of the band by first securing means and is provided with second securing means in the form of a fastener which extends through the band for securing an accessory to the outer face of the band.

BRIEF DESCRIPTION OF THE DRAWINGS

For a better understanding of the present invention, and to show more clearly how it may be carried into effect, reference will now be made, by way of example, to the accompanying drawings, in which.

DETAILED DESCRIPTION OF EXAMPLE EMBODIMENTS

Figure 1:
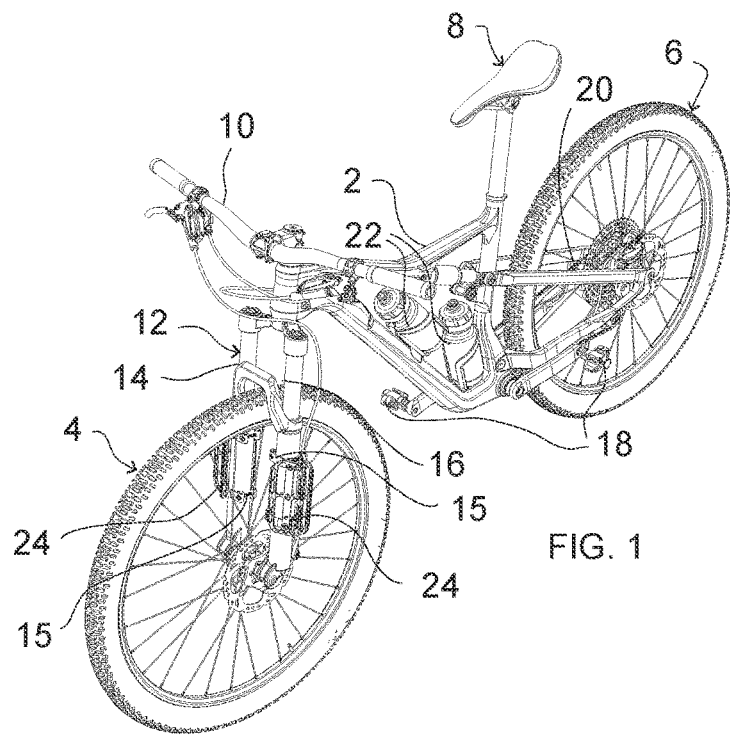
FIG. 1 shows a bicycle.

The bicycle shown in FIG. 1 is a mountain bike suitable for bikepacking. Although not shown, it may be provided with one or more luggage racks, panniers and other accessories for carrying the equipment needed for multi-day touring.

The bike of FIG. 1, as is conventional, comprises a frame 2 carrying front and rear wheels 4, 6, a saddle 8 and handlebars 10 for steering the front wheel 4 which is supported by a front fork 12 having telescopic limbs in the form of suspension struts 14, 16 which constitute frame members of the bike. Pedals 18 drive the rear wheel 6 through a chain 20.

Some frame members of the frame 2 are provided with brazed-in tapped inserts to which cages for water bottles 22 can be fixed. By using these tapped inserts the water bottles or other accessories, such as a pump or a luggage bag, can be rigidly fixed to the frame in a manner which avoids movement of the accessory. Such movement can cause fluctuating changes in weight distribution so destabilising the bike, and which can bring the accessory into contact with the rider or moving parts of the bike.

Figure 2:
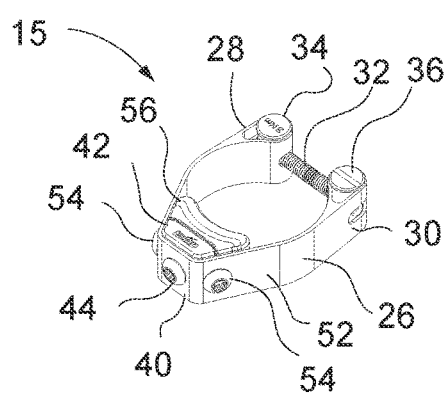
FIG. 2 shows a mounting device for attaching an accessory to a frame member of the bicycle shown in FIG. 1.
Figure 3:
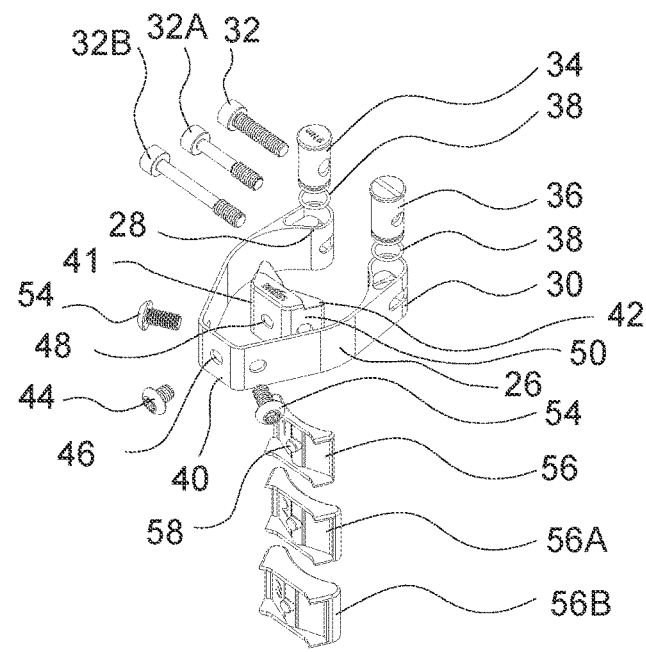
FIG. 3 is an exploded view of the mounting device of FIG. 2, including alternative components.

It is desirable to use other frame members, which do not have integral tapped inserts, for carrying additional accessories. For example, as shown in FIG. 1, support cages 24 are secured to the struts 14, 16 of the front fork 12. FIGS. 2 and 3 illustrate a mounting device 15 for attachment to the struts 14, 16 (or other frame members of the bike shown in FIG. 1 including, for example, tubes of the mainframe, the seatpost, the chain and seat stays, and the handlebars) to enable the support cages 24 to be fitted. The mounting device 15 comprises a flexible band 26, made from any suitable material, such as carbon fibre, stainless steel, or other composite, metallic or polymeric material. The material is preferably resistant to creep, to avoid the band 26 stretching and so loosening over time. The band 26 has an open-ended structure and its ends 28, 30 are interconnected by securing means in the form of a bolt 32 which extends through a plain bore in a barrel 34 into a tapped bore in a barrel nut 36. Washers 38 rotatably support the barrel 34 and the barrel nut 36 in openings 38 formed at the ends of the band 26 by looping the material of the band back upon itself.

Approximately centrally between the ends 28, 30, the band has a flat central section 40 against which a central abutment surface 41 of a connection block 42 is clamped by a screw 44 constituting a first fastening means. For this purpose, the central section 40 has a hole 46 and the connection block 42 has a tapped bore 48 (see FIG. 3). The connection block is made from a suitable rigid material, such as aluminium.

Figure 6:
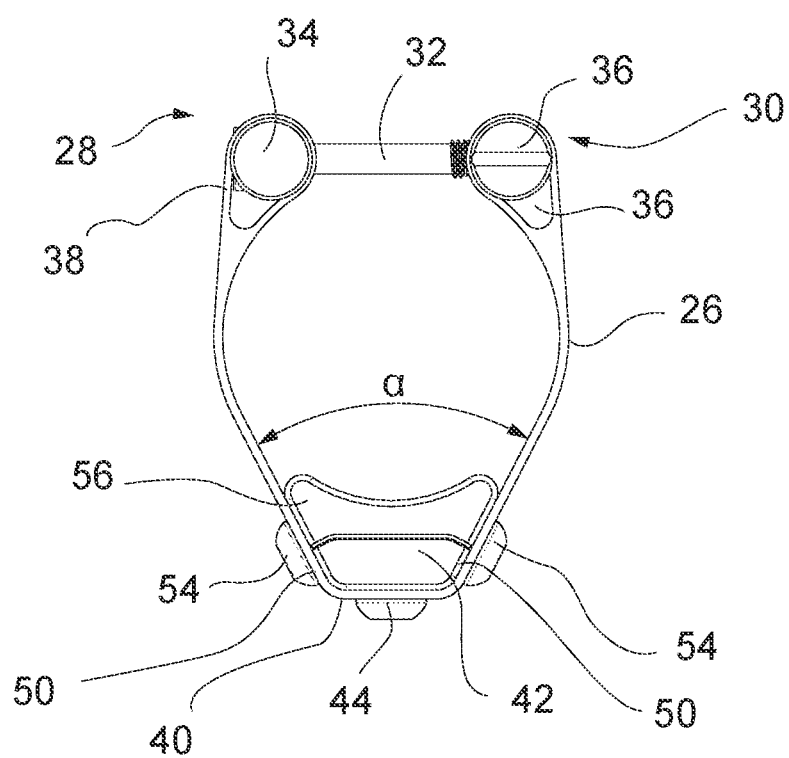
FIG. 6 is a plan view of the mounting device shown in FIG. 4.

As shown in FIG. 6, the connection block 42 has a pair of mounting surfaces 50 which extend from the central abutment surface 41 and diverge from each other at an angle α of not less than 45° and not more than 120°, and preferably at an angle of 57° to 63°. Each of these mounting surfaces lies against a complementary flat inner surface of a lateral section 52 of the band 26. Second fastening means in the form of screws 54 extend, like the screws 48, through a plain hole in the section 52 into a tapped bore in the respective mounting surface 50.

A pad 56 is removably fitted to the face of the connection block 42 away from the abutment surface 41. The pad 56 is made from a suitable resilient material which can conform to the shape and dimensions of the frame member 14, 16, and preferably provides a high coefficient of friction against the frame material to which the mounting device is fitted, for example the struts 14, 16. The material may, for example, be an elastomeric material such as rubber or it could be a polymeric one such as nylon or acetal. The use of such materials not only provides frictional contact with the strut 14, 16, but also avoids any hard material "digging in" to the strut which could damage or distort the fork and/or stop the internal functioning as the 'high point' stops the pistons within the strut sliding. The pad 56 can be fitted to the connection block 42 in any suitable manner, but preferably it is a push fit on the connection block 42 and has, for this purpose, a moulded-in stud 58 which is a friction fit within a hole in the connection block 42. The surface of the pad 56 facing away from the central abutment surface of the connection block 42 is shaped to conform to the profile of the strut 14, 16, and, in this embodiment, is consequently part-cylindrical. However, the resilient nature of the material of the pad 56 means it can conform to the profile of the strut 14, 16 or other frame member (even if not circular), and so the surface of the pad 56 which engages the strut 14, 16 may be flat or of any other suitable shape.

FIG. 3 shows the components of a kit of parts from which the mounting device 15 of FIG. 2 can be assembled. It will be appreciated from FIG. 3 that, as well as the bolt 32 and the pad 56, there are two further bolts 32A and 32B, and two further pads 56A and 56B. The bolts 32A and 32B are of the "captive bolt" type, in that the screw thread is removed between the ends of the bolt. This is to avoid contact with larger diameter struts 14, 16, with possible damage to the strut. As will be described below, the user can select which bolt and which pad is to be used in any particular application.

Figures 4, 5:
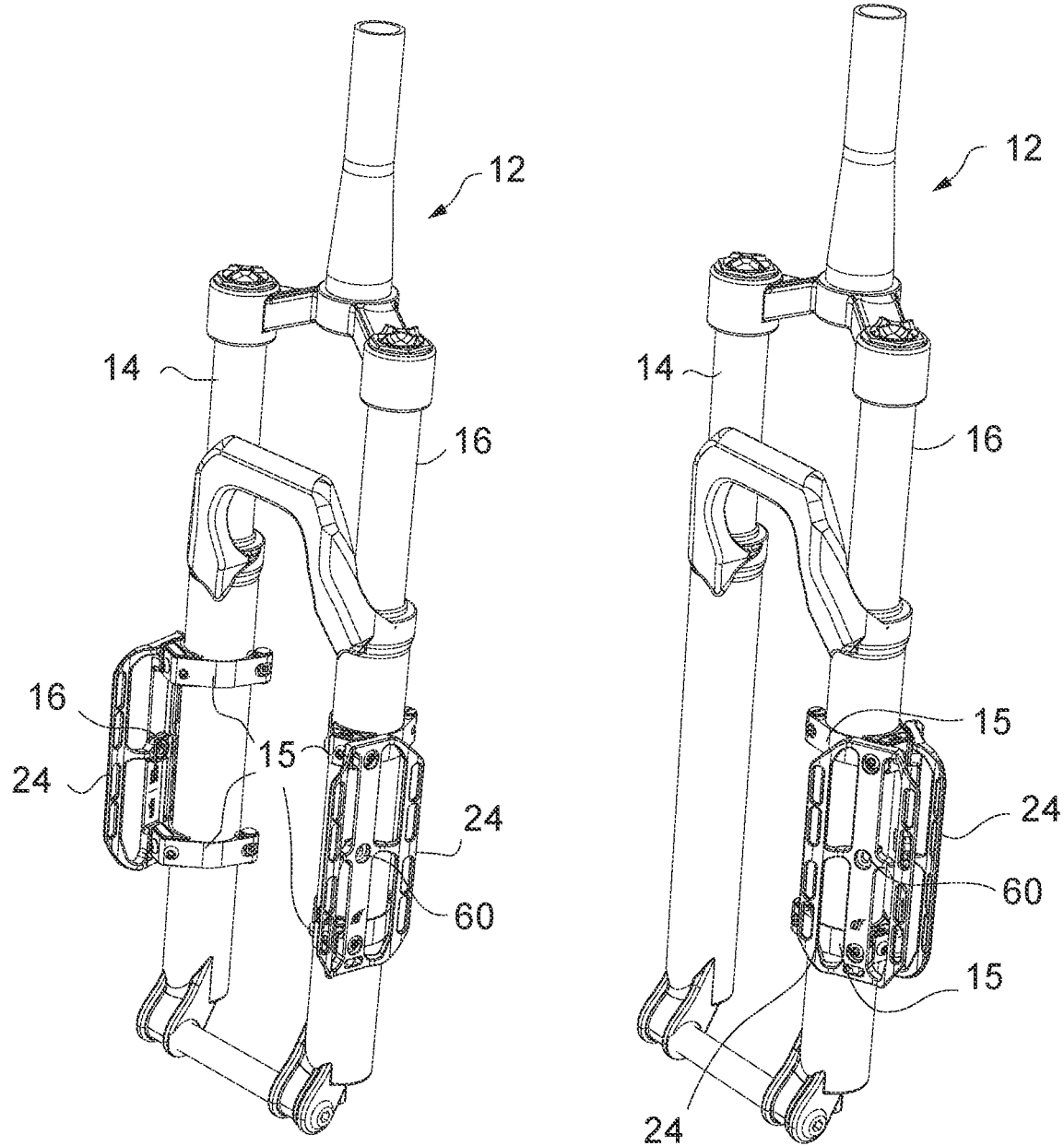
FIG. 4 shows a bicycle front fork provided with accessory mounting frames secured to the limbs of the fork by mounting devices as shown in FIG. 2.
FIG. 5 corresponds to FIG. 4 but shows a pair of mounting frames secured to the same limb of the fork by common mounting devices.

For use, one or more of the mounting devices 15 are fitted to the respective structure 14, 16 (or other frame member of the bike). For example, as shown in FIG. 4, two of the mounting devices 15 are fitted to each of the struts 14, 16 at different positions along the respective strut. To fit each mounting device 15, starting from the dismantled condition as shown in FIG. 3, the pad 56 is fitted to the connection block 42, and the connection block 42 is then attached to the band 26 by means of the screw 44. The central abutment face 41 of the connection block 42 is thus clamped against the inner face of the central section 40 of the band 26. The lateral sections 52 of the band 26 engage the mounting surfaces 50 of the connection block 42 under the resilience of the band 26. If desired, the accessory, for example the cage 24, can be fitted to the connection block 42 before the pad 56 is fitted, to ensure that the screws 54 do not penetrate through the connection block 42 to the extent that they could contact the strut 14, 16 and cause damage. Once this is established, the pad 56 can be fitted and the rest of the assembly operation can proceed.

With the bolt 32 separated from the band 26, the ends 28, 30 of the band 26 are displaced apart from each other to enable the band 26 to be fitted over the strut 14, 16. The barrel 34 and the barrel nut 36 are then inserted into the openings at the ends 28, 30 of the band 26. The barrel 34 and the barrel nut 36 are shown slotted at their ends, so that they can be rotated, for example using a screwdriver, to align them so as to enable the bolt 32 to be passed through the opening in the barrel 34 into the tapped hole in the barrel nut 36. However, the barrel 34 and the barrel nut 36 can be rotated relatively easy by hand, and so the slot can be omitted. The bolt 32 can then be tightened, for example using an Allen key, to retain the band 26 on the strut 14, 16. In this condition, the strut 14, 16 is gripped by the inner surface of the band 26, and by the pad 56 on the connection block 42. It has been found that a tightening torque of around 3 Nm is sufficient to secure the mounting device 15 sufficiently tightly on the strut 14, 16 to resist movement under normal use, without damaging the strut 14, 16.

With reference to FIG. 4, the second mounting device 15 is fitted to the strut in the same way at a suitable distance from the first mounting device 15. Initially, the bolts 32 are not tightened fully, so that the mounting devices 15 can be moved both along and around the respective strut 14, 16 so that they can be positioned to receive the cage 24. The cage 24 is provided with holes 60 (only one of which is visible in each of the brackets shown in FIG. 4) which may be spaced apart by standard spacing used for brazed-in nuts on other frame members of the bike. The holes 60 can receive the screws 54 (FIGS. 2 and 3) which then pass through the plain hole in the respective lateral section 52 into the tapped openings in the mounting surfaces 50. When the cage 24 is suitably positioned on the respective strut 14, 16, the bolts 32 of the two mounting devices 15 as well as the screws 54 are tightened to fix the mounting devices 15 and the cage 24 rigidly to the respective strut 14, 16.

The same procedure can be followed to secure the second cage 24 to the other strut 14, 16.

It will be appreciated that the lateral sections 52 of the band 26 lie in planes which extend tangentially of, and very close to, the periphery of the respective strut 14, 16. This means that the cage 24 is also held close to the strut 14, 16, which means that any load carried by the cage 24 has the shortest possible moment arm from the axis of the strut 14, 16 so reducing the torque applied to the mounting devices 15 as a result of jolting movements when the bike is ridden over rough terrain. This in turn reduces turning loads which might tend to rotate the mounting devices 15 around the struts 14, 16. Also, by mounting the cage 24 as close as possible to the periphery of the strut 14, 16, the overall assembly is kept compact.

With regard to FIG. 5, it will be appreciated that the design of the mounting device 15 enables two cages 24 to be fitted to the same device (or pair of devices 15 as shown in FIG. 5). Thus, each mounting device 15 carries one cage 24 on one of the mounting surfaces 50 of each connection block 42, and a second cage 24 on the other of the mounting surfaces 50.

Different mountain bikes have different front fork assemblies 12, with different diameters of the strut 14, 16. In order to enable the band 26 to fit different diameters of strut 14, 16, the three bolts 32, 32A and 32B are provided, having different lengths from each other, and the three pads 56, 56A and 56B are provided, having different thicknesses in the radial direction with respect to the axis of the strut 14, 16. Thus, when the mounting device 15 is to be fitted to a relatively small diameter strut 14, 16, the shortest bolt 32 and the thickest pad 56 will be used. The intermediate bolt 32A and intermediate pad 56A will be used for larger diameter struts 14, 16, while the longest bolt 30 2B and the thinnest pad 56 will be used for the largest strut diameter. In this way, the same band 26 and connection block 42 can be used for a variety of strut and other frame member diameters.

Although the mounting device 15 has been described above as fitted to the telescopic struts 14, 16, the same mounting device 15 can be used for attaching accessories to other parts of the frame 2 of the bicycle. Also, although the bicycle shown in the Figures is a mountain bike, the mounting device 15 can also be used with other types of bicycle.

For the avoidance of doubt, the present application extends to the subject-matter described in the following numbered paragraphs (referred to as "Para" or "Paras"):

Para 1. A bicycle accessory mounting device comprising a flexible band having securing means which interconnects the ends of the band to draw the band around a frame member of a bicycle, and a connection block which is secured to the inner face of the band and is provided with a fastener which extends through the band for securing an accessory to the outer face of the band.

Para 2. A mounting device as in Para 1, in which a pad of resilient material is fitted to the connection block for contact with the frame member.

Para 3. A mounting device as in Para 2, in which the pad is releasably connected to the connection block.

Para 4. A mounting device as in Para 3, in which the pad is a push fit on the connection block.

Para 5. A mounting device as in any one of Paras 2 to 4, in which the pad has a concave surface for contact with the frame member.

Para 6. A mounting device as in any one of the preceding Paras, in which the securing means is a screwthreaded bolt which extends between the ends of the band.

Para 7. A mounting device as in Para 6, in which one end of the band is provided with a barrel nut which is engaged by the bolt.

Para 8. A mounting device as in Para 7, in which the other end of the band is provided with a barrel having a plain bore through which the bolt extends.

Para 9. A mounting device as in any one of the preceding Paras, in which the connection block is secured to the band substantially centrally between the ends of the band.

Para 10. A mounting device as in Para 9, in which the connection block is secured to the band by a screw which extends through a hole in the band into a tapped bore in the connection block.

Para 11. A mounting device as in Para 9 or 10, in which the connection block has a central abutment surface at which the connection block is secured to the band, and a pair of mounting surfaces which extend from the abutment surface and diverge from each other in the direction away from the abutment surface, the fastener being one of two fasteners provided at the respective mounting surfaces.

Para 12. A mounting device as in Para 11, in which the abutment surface and the mounting surfaces are flat, and engage respective complementary flat surfaces of the band.

Para 13. A mounting device as in Para 12, in which the mounting surfaces are inclined to each other at an angle not less than 45° and not more than 120°.

Para 14. A mounting device as in any one of the preceding Paras, in which the or each fastener is a screw which extends through a respective hole in the band and engages a tapped bore in the connection block.

Para 15. A kit of parts for assembly to form a mounting device as in any one of the preceding Paras, the kit comprising:
the band,
the securing means,
the connection block, and
the fastener.

Para 16. A kit of parts as in Para 15 when appendant to Para 2, further comprising the pad.

Para 17. A kit of parts as in Para 15 or 16, in which a plurality of different pads are provided.

Para 18. A kit of parts as in any one of Paras 15 to 17, in which a plurality of different securing means are provided.

Para 19. A bicycle provided with an accessory which is mounted on a frame member of the bicycle by means of a mounting device as in any one of Paras 1 to 14 or assembled from a kit as in any one of Paras 15 to 18.

Para 20. A bicycle as in Para 19, in which the accessory is a bottle holder or a luggage container.

Para 21. A bicycle as in Para 20 when appendant to Para 11, in which two accessories are mounted on the mounting device by the respective fasteners.

What is claimed is:

1. A bicycle accessory mounting device comprising:
a flexible band having opposite ends and inner and outer faces;
securing means which interconnects the ends of the band thereby to draw the band around a frame member of a bicycle;
a connection block having a central abutment surface at which the connection block is secured to the inner face of the band, and a pair of mounting surfaces which extend from the abutment surface and diverge from each other in the direction away from the abutment surface;
respective fasteners provided on the mounting surfaces, the fasteners extending through the band for securing a respective accessory to the outer face of the band; and
a pad of resilient material which is releasable connected to the connection block for contact with the frame member.

2. A mounting device as claimed in claim 1, wherein the pad is a push fit on the connection block.

3. A mounting device as claimed in claim 1, wherein the pad has a concave surface for contact with the frame member.

4. A mounting device as claimed in claim 1, wherein the securing means is a screwthreaded bolt which extends between the ends of the band.

5. A mounting device as claimed in claim 4, wherein one end of the band is provided with a barrel nut which is engaged by the bolt.

6. A mounting device as claimed in claim 5, wherein the other end of the band is provided with a barrel having a plain bore through which the bolt extends.

7. A mounting device as claimed in claim 1, wherein the connection block is secured to the band substantially centrally between the ends of the band.

8. A mounting device as claimed in claim 7, wherein the connection block is secured to the band by a screw which extends through a hole in the band into a tapped bore in the connection block.

9. A mounting device as claimed in claim 1, wherein the abutment surface and the mounting surfaces are flat, and engage respective complementary flat surfaces of the band.

10. A mounting device as claimed in claim 9, wherein the mounting surfaces are inclined to each other at an angle not less than 45° and not more than 120°.

11. A mounting device as claimed in claim 1, wherein the fasteners are screws which extend through respective holes in the band and engage respective tapped bores in the connection block.

12. A kit of parts for assembly to form a mounting device as claimed in claim 1, the kit comprising:
the band,
the securing means,
the connection block, and
the fasteners.

13. A kit of parts as claimed in claim 12, further comprising a pad of resilient material for fitting to the connection block.

14. A kit of parts as claimed in claim 12, wherein the pad is one of a plurality of different pads provided in the kit.

15. A kit of parts as claimed in claim 12, wherein the securing means is one of a plurality of different securing means provided in the kit.

16. A bicycle provided with an accessory which is mounted on a frame member of the bicycle by means of a mounting device as claimed in claim 1.

17. A bicycle as claimed in claim 16, wherein the accessory is a bottle holder or a luggage container.

18. A bicycle as claimed in claim 17, wherein two accessories are mounted on the mounting device by the respective fasteners.

19. A bicycle provided with an accessory which is mounted on a frame member of the bicycle by means of a mounting device assembled from a kit as claimed in claim 12.

20. A bicycle accessory mounting device comprising:
a flexible band having opposite ends and inner and outer faces;
securing means which interconnects the ends of the band to draw the band around a frame member of a bicycle; and
a connection block having:
a central abutment surface which abuts the inner face of the band, the band being secured to the central abutment surface by a first fastening means, and
a pair of mounting surfaces which extends from opposite ends of the abutment surface and diverge from each other in the direction away from the abutment surface;

the mounting device further comprising:

second fastening means in the form of respective fasteners engaging the connection block at the mounting surfaces, the fastener extending through the band for securing a respective accessory to the outer face of the band.

21. A bicycle accessory mounting device comprising:

a flexible band h vin oppo site ends and inner and outer faces;

securing means which interconnects the ends of the band thereby to draw the band around frame member of a bicycle, the securing means being screwthreaded bolt which extends between the ends of the band;

a connection block having a central abutment surface at which the connection block is secured to the inner face of the band, and a pair of mounting surfaces which extend from the abutment surface and diverge from each other in the direction away from the abutment surface;

respective fasteners provided on the mounting surfaces, the fasteners extending through the band for securing a respective accessory to the outer face of the band; and wherein one end of the band is provided with a barrel nut which is engaged by the bolt.

22. A mounting device as claimed in claim 21, wherein the other end of the band is provided with a barrel having a plain bore through which the bolt extends.

23. A mounting device as claimed in claim 21, wherein the abutment surface and the mounting surface are flat, and engage respective complementary flat surfaces of the band.

24. A mounting device s claimed in claim 23, wherein the mounting surfaces are inclined to each ter at an angle not less than 45° and not more than 120°.

\* \* \* \* \*